United States Patent [19]
Duffy et al.

[11] 3,796,123
[45]* Mar. 12, 1974

[54] SHEET METAL NUT

[75] Inventors: William B. Duffy, Berkeley Heights; Charles K. Fisher, Belford, both of N.J.

[73] Assignee: TRW Inc., Cleveland, Ohio

[ * ] Notice: The portion of the term of this patent subsequent to May 2, 1989, has been disclaimed.

[22] Filed: Jan. 17, 1972

[21] Appl. No.: 218,246

[52] U.S. Cl. .............................................. 85/32 R
[51] Int. Cl. ........................................... F16b 37/02
[58] Field of Search ....................... 85/32 R; 151/38

[56] References Cited
UNITED STATES PATENTS
3,659,491  5/1972  Duffy et al. ........................... 151/38

*Primary Examiner*—Marion Parsons, Jr.
*Attorney, Agent, or Firm*—James R. O'Connor; Hall & Houghton

[57] ABSTRACT

A sheet metal nut having an inner threaded barrel portion connected to an outer, hexagonally shaped barrel portion by a connecting web adjacent one end of said barrel portions has an hexagonally shaped depression formed in the inner barrel portion over a limited axial extend thereof adjacent the connecting web. The internal faces of the hexagonal depression are disposed opposite to and match the hex wrenching faces on the outer barrel portion and are effective to transmit torque to the inner barrel portion when the nut is turned onto a mating bolt thereby reducing the torsional strain on the connecting web incident to tightening of the nut.

3 Claims, 9 Drawing Figures

PATENTED MAR 12 1974  3,796,123
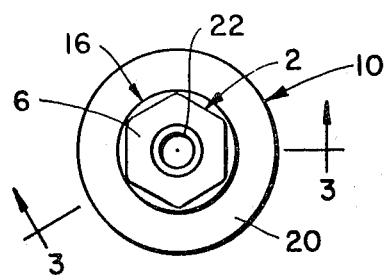
FIG. 1
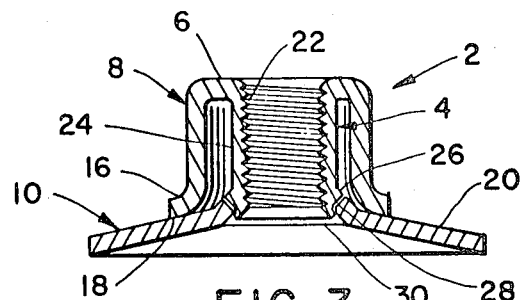
FIG. 3
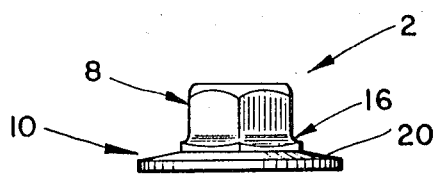
FIG. 2
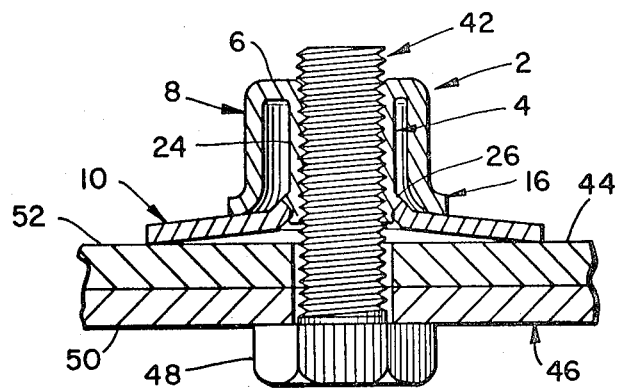
FIG. 4
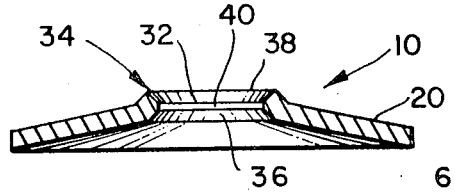
FIG. 5
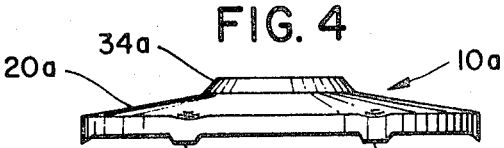
FIG. 7
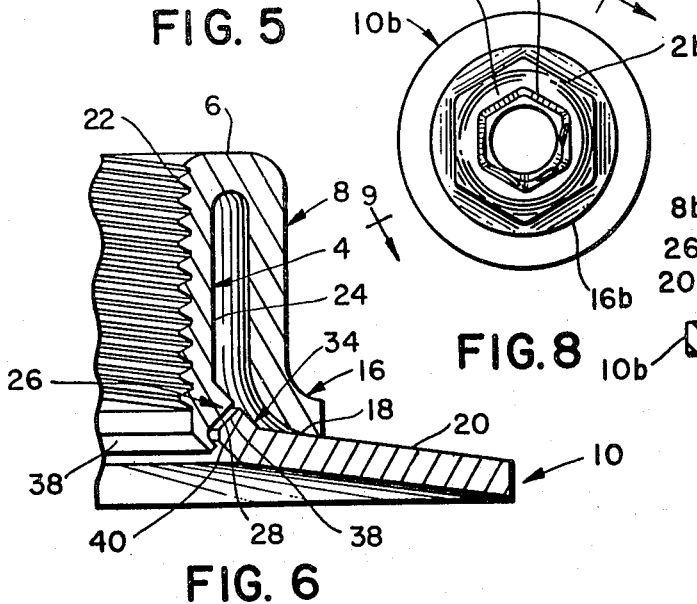
FIG. 6
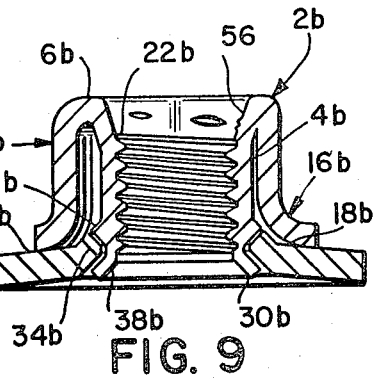
FIG. 8
FIG. 9

SHEET METAL NUT

CROSS-REFERENCE TO RELATED APPLICATION

This application relates to our copending application, U.S. Ser. No. 121,636, filed Mar. 8, 1971, now U.S. Pat. No. 3,659,491, issued May 2, 1972. The claims appended to this application are, however, patentably distinct from those of the said copending application and said Patent. Both applications and said Patent are assigned to a common assignee, to wit, TRW Inc.

BACKGROUND OF THE INVENTION

1. Field of the Invention

The invention relates to coupled nut and washer assemblies, particularly assemblies of the type wherein the nut is of sheet metal construction and the components of the assembly are freely rotatable relative to one another.

2. Description of the Prior Art

The prior art includes numerous preattached or preassembled nut and washer assemblies. In the earlier art one finds disclosures of integral nut and washer combinations and assemblies wherein the components are separately fabricated but nonrotatably coupled. Characteristic of the foregoing devices is the disclosure of U.S. Pat. No. 2,761,349 (R. M. Heller) wherein combinations and assemblies of both sheet metal and headed components are depicted. While integral and fixed assemblies of the type exemplified by Heller have made a recognized contribution to the art with respect to convenient handling by the user, simplification of packaging and shipping as compared with separate nuts and washers, reduction of the loss of washers to be used with nuts in given installations, and effective insurance that the proper size and shape of washer is consistently available for use in a specified application; it has likewise been recognized that in applying such parts to cooperating bolts or studs and tightening same against a workpiece surface, excessively high torque must be applied to the nut to achieve a desired tension on the bolt or stud in that continuous simultaneous rotation of the nut and washer, subsequent to engagement of the workpiece by the washer, precipitates a markedly increased resistance to turning of the nut and thus an extremely rapid and highly undesirable applied torque increase. In addition, the edge of the washer scores and often gouges or cuts a groove in the confronting workpiece surface and the increasing resistance to rotation creates problems with respect to the peeling, rupturing and deforming of sealing elements when such elements are disposed adjacent the undersurface of the washer.

Having recognized the aforementioned deficiencies in integral or fixed assemblies, designers later moved to eliminate same through the development of combinations wherein the washer element was capable of rotation relative to the nut and wherein the latter component could be headed or sheet metal construction and carry either a multiconvolution thread of a standard type or a single helix thread engager, or a thread cutting or forming element for engaging an unthreaded stud. U.S. Pat. Nos. 2,943,661 (W. Stern) and 2,851,079 (R. M. Heller) and British Pat. No. 929,807 (United-Carr Fastener Corporation) contain pertinent disclosures to which reference may be had for a clearer understanding of the advantages to be derived from combinations wherein the components are relatively rotatably coupled. Notwithstanding the fact that the last mentioned Heller and Stern and United-Carr Fastener disclosures placed particular emphasis on the merits of rotatable combinations with respect to the minimization of the risk of deformation or other damage to sealing means employed in conjunction with the parts disclosed therein, the fast remains that the extent to which that objective was realized was primarily attributable to the capacity of the disclosed nuts to rotate independently of any coincident rotation of the washer subsequent to initial clamping engagement of the washer with the confronting surface of a workpiece. However, regardless of the presence or absence of a sealing element, the principal objective sought to be achieved in the construction of rotatably coupled nut and washer assemblies is the reduction of the torque which must be applied to the nut to realize a specified degree of tension on a bolt, screw or stud, etc., onto which the nut is turned. Thus it follows that a construction, particularly with regard to the nut to washer connection, which renders the components free spinning relative to one another and greatly reduces the possibility of any continuing washer rotation subsequent to initial clamping of the washer against a workpiece surface, not only provides for greatly improved torque-tensile relationship in the fastener application but also even further minimizes the potential for sealer deformation, even in situations wherein the bond between the sealing element and the washer is weak or the sealing element per se is structurally defective.

The principal motivating force behind the development of the presently disclosed device was to realize the aforementioned critical objective through an improved rotatably coupled sheet metal nut and washer assembly. The extent to which that purpose has been accomplished can be appreciated by way of a more detailed inspection of the aforementioned patents when considered in the light of the description of a preferred embodiment of the improved assembly which follows hereinafter.

SUMMARY OF THE INVENTION

A fastener assembly of the type wherein a sheet metal nut having inner and outer barrel portions is rotatably assembled with an apertured lock washer. The outer nut barrel portion includes a peripheral skirt which rotatably bears on the washer adjacent the aperture therein. The assembly is particularly characterized by an improved nut to washer connection including a connecting collar on the inner nut barrel portion which is curled under the internal edge of the aperture in the washer, the washer having a recessed undersurface in which portions of the connecting collar are seated, and a peripheral bearing ring on the inner nut barrel portion disposed adjacent the connecting collar and the washer aperture. The said bearing ring is formed from metal skived from the inner nut barrel portion and compacted into the ring configuration. The bearing ring has a smooth undersurface disposed at a selectively predetermined angle to the longitudinal axis of the nut and the washer has a smooth surface adjacent the aperture therein, which latter surface is complementary to and in confrontation with the undersurface of the bearing ring. Thus, the connecting collar and bearing ring cooperate to maintain the nut and washer in an assembly wherein the said components are free spinning relative to one another. The said construction is particularly adapted to provide an improved torque-tensile relationship in effecting a coupling wherein said fastener assembly is turned onto a cooperating male fastener element protruding through an apertured member and the washer is tightened against the confronting surface of the member.

BRIEF DESCRIPTION OF THE DRAWINGS

FIG. 1 is a top plan view of a nut and washer assembly according to the invention;

FIG. 2 is a side elevational view of the assembly depicted in FIG. 1;

FIG. 3 is an enlarged view of a cross section taken on line 3—3 of FIG. 1;

FIG. 4 is a view of the invention similar to FIG. 3 as applied to a cooperating bolt to secure two overlapping apertured members which are depicted fragmentarily and in cross section;

FIG. 5 is an enlarged transverse cross-sectional view of the washer component;

FIG. 6 is a further enlarged view of the right side of FIG. 3 depicting the improved nut to washer connection;

FIG. 7 is an enlarged side elevational view of a slightly modified embodiment of the washer component;

FIG. 8 is a plan view of a modified form of a nut and washer assembly according to the invention; and FIG. 9 is an enlarged view of a cross section taken on line 9—9 of FIG. 8.

DESCRIPTION OF A PREFERRED EMBODIMENT

A relatively rotatable nut and washer assembly according to the invention includes a nut 2 drawn from sheet metal and having an inner barrel portion 4 connected at its upper end through a web 6 to an outer, hexagonally shaped barrel portion 8 which circumscribes the inner barrel portion in spaced relationship thereto, and a frusto-conically shaped, spring lock washer 10 which is rotatably coupled to the lower end of the inner barrel portion 4 of the nut.

The lower end of the outer nut barrel portion 8 includes a radially extending peripheral skirt 16 having a smooth undersurface 18 which is complementary to and, in the assembly, rotatably bears on the upper convex surface 20 of the washer 10. The inboard wall of the inner nut barrel portion 4 carries a multiconvolution thread 22 of a standard type which is adapted for threaded engagement with a cooperating bolt. Adjacent its lower end, the outboard wall 24 of the said inner barrel portion carries a peripheral bearing ring 26. The bearing ring 26 is formed from metal skived from the outboard wall 24 and compacted into said ring configuration during fabrication of the nut. Further, the bearing ring has a generally triangular configuration as is clearly seen in the cross-sectional views of FIGS. 3, 4 and 6 and also has a smooth, nonburred undersurface 28 disposed at a selected acute angle to the longitudinal axis of the nut. The surface 28 is ideally, but not necessarily, at an angle on the order of 45° to the longitudinal axis of the nut or an engaged bolt in that tests have indicated that, when the said undersurface is disposed at an acute angle substantially less than 45°, the frictional resistance to tightening of the nut on a bolt rises appreciably in that the confronting complementary surface of the washer to be described hereinafter tends to clamp or jam the inner nut barrel against the bolt shank to an excessive degree in what might best be described as a collet effect. Immediately adjacent and below the bearing ring 26, the said inner barrel portion terminates in a connecting collar 30 which, subsequent to nut formation and prior to coupling wit the washer, lies generally parallel to the aforementioned nut axis.

As best seen in FIG. 5, the frusto-conical spring lock washer 10 has a central through aperture 32, a generally cylindriform lip 34 projecting upwardly from its convex surface 20 adjacent the aperture 32 and a recess 36 formed in its under or concave face adjacent the said aperture. The inboard surface 38 of the lip 34 has a downwardly tapering, funnel-like configuration and the recess 36 has a generally corresponding but inverted funnel shape and the said respective lip and recess surfaces intersect in a very thin circumferential rim 40 which in effect defines the minor diameter of the aperture 32.

In effecting the assembly of the washer 10 to the nut 2, the initially coaxial roller 30 is inserted into the aperture 32 in the washer and thereafter flared outwardly whereby its terminal end is loosely cured under the circumferential rim 40 and nested in the recess 36. Thus, the undersurface 18 of the skirt 16 is brought to bear against a localized area of the convex face 20 of the washer (said area being generally but not necessarily always less than one-half the total area of said convex face), and the complementary smooth surfaces 28 and 38 of the bearing ring and washer lip, respectively, are also placed in opposed or confronting relationship. While the aforementioned nut to washer connection is relatively loose to permit free spinning of the components relative to one another, the connection is likewise effective to maintain the components in assembly under normal conditions of usage, to wit, during packaging, shipping and repeated applications to and removal from a cooperating bolt.

By having particular reference to FIG. 6, the reader will observe what is considered to be an ideal nut to washer connection, i.e., one wherein the nut skirt is in contact with the opposing surface of the washer but there are slight gaps, on the order of .010 inch, between the surfaces 28 and 38 of the bearing ring and washer, respectively, and .005 inch between the opposing portions of the collar 30 and the recess 36. Tests conducted to date indicate that the maintenance of the aforementioned spacing insures a freely rotatable combination and, what is equally significant, insures that the skirt 16 of the nut is always in contact with the confronting washer surface to provide at least a minimal bias of the washer toward the engaged surface of a workpiece and effect a resultant locking tension on a cooperating bolt in a joint wherein relatively low torque is applied to the nut incident to preliminary or even final specified torquing of the nut.

In a typical joint such as that depicted in FIG. 4, the improved fastener assembly is applied to the shank of a threaded bolt 42 to secure a first apertured member 44 to a second apertured member 46 wherein the latter is usually the fixed or base member in the joint. When the nut is turned onto the bolt to the point where the head 48 of the bolt is drawn against the remote surface 50 of the second member 46 and the lower peripheral washer edge is pressed against the proximate surface 52 of the first member 44 under relatively minimal clamping pressure or bias exerted on the washer by the nut skirt, the washer thereupon ceases further corresponding rotation with respect to the nut or the engaged member's surface 52 and independent rotation of the nut may be continued until the specified degree of torque has been applied thereto, as dictated by the tightness desired in the joint, the grade of bolt utilized and other variable factors which will be obvious to those familiar with the art. As may be readily observed from a comparison of FIGS. 3 and 4, continued turning of the nut onto the bolt, absent any further washer rotation, precipitates a discrete flattening of the spring lock washer 10 due to the pressure exerted thereon by the skirt 16, and thus the washer exerts a reverse axial tension on the nut to lock the interengaged nut and bolt threads in the well-known manner. Further, since only the nut component rotates during tightening of the joint, the amount of torque which must be applied to the nut to achieve the desired tension on the bolt is substantially reduced. To put it in other words, during tightening there is negative development of false or unnecessary torque which would otherwise result from coincident rotation of the washer against the confronting surface 52 of the member 44. From a still closer inspection of FIG. 4, one will observe that the progressive build up of tension in the joint incident to the application of ultimate tightening torque to the nut exerts an axial pull on the inner nut barrel which yields downwardly to close the gap between the bearing ring and washer and precipitates a consequent clamping of the confronting washer surface 38 against the opposed surface 28 of the bearing ring. Even after these surfaces are placed in contact and the bearing ring surface is rotating against the washer, the smooth, complementary configuration of the opposed surfaces permits continued unimpeded rotation of the nut with only negligible, if any, increase in the torque required to overcome the minimal increase in rotation resisting friction. Moreover, the presence of the bearing ring in the combination prevents the inner nut barrel from being pulled through the washer aperture as the barrel yields downwardly responsive to the tension build up described above, and, what is equally if not more important, the clamping of the washer against the bearing ring transfers a compressive force from the flattened spring washer directly to the lower end of the inner nut barrel whereby the said barrel end is urged inwardly and the nut thread embraces both the upper and lower faces of the mating bolt thread. When the nut is torqued up to the point where the mating bolt is approaching its ultimate tensional strength, the aforementioned inward pressure on the nut barrel provides for an effective and improved locking and resistance to loosening of the components in the joint. Thus, the bearing ring 26 provides for the effective transfer of at least a portion of the reactive tensional force from the compressed spring washer directly to the inner nut barrel and the engaged threads and contributes a functional improvement in joints of the type disclosed, particularly wherein sheet metal components are utilized. In fact, tests conducted to date indicate that, regardless of the amount of torque required to generate a desired amount of tension in a mating bolt, the ultimate tension which can be derived is approximately doubled when the bearing ring is present at an angle of approximately 45°, as compared with an assembly wherein the inner nut barrel does not embody a bearing ring or equivalent element. It should also be noted that while the surface 28 of the bearing ring was earlier described as being at a selected acute angle to the longitudinal nut axis, the said surface may not necessarily be straight, but rather may be slightly convex while the surface 38 of the washer may be complementarily convex, whereby frictional resistance to relative rotation is further obviated.

FIG. 7 depicts a slightly modified washer 10a which includes a plurality of spaced projections or teeth 54 depending from the undersurface thereof, which projections or teeth are particularly adapted for biting engagement with the surface of a metallic mounted member to effect an electrical ground where required. The same projections or teeth will also afford additional resistance to washer rotation during nut tightening.

By again having reference to FIGS. 3 and 4, the reader will also readily appreciate that, as compared with an assembly of a headed nut devoid of a peripheral skirt and a rotatable washer, the skirt of the sheet metal nut of the present invention provides a barrier between the convex washer surface 20 and the leading end of a power driver chuck. Ergo, when such a tool is utilized to tighten a nut, the skirt inhibits undesirable scoring or marring of the washer finish beyond the peripheral edge of the nut skirt.

The modified embodiment of the invention depicted in FIGS. 8 and 9, is essentially the same as that earlier described, particularly with reference to the nut to washer connection. Further, the modified form is designed to function in the same manner in cooperation with a bolt in a joint and may carry the alternate type of toothed lock washer depicted in FIG. 7. However, in adapting the invention to accommodate larger sizes of bolts, i.e., bolts on the order of 1/4 inch diameter or larger, it was observed that during final tightening wherein the ultimate tensional strength of the bolt was being approached, it became somewhat difficult to deliver the torque required to rotate the inner nut barrel through the wrenching faces of the outer hex barrel and the outer barrel frequently sheared away from the tubular inner barrel at the connecting web. Responsive to further experimentation, it was discovered that the aforementioned problem in larger sizes could be negated by providing a hex-shaped depression 56 in the upper end of the inner nut barrel 4b during the process of nut formation and prior to the tapping of the said barrel. There are several reasons why the formation of the hex depression 56 is seen to strengthen the nut and increase its torsional resistance to shearing at the web. To begin with, one will readily appreciate that the compacting of the metal, incident to depression formation, work hardens the metal to impart increased strength in the critical area. Further, as is best depicted in FIG. 9, the metal at the internal wall of the hex depression is displaced outwardly of the path of the threading tap, ergo only partial, if any, thread is formed in the depression and consequently there is negligible weakening of the wall adjacent the web. Still further, and perhaps most significant, is the fact that the internal hex depression provides positive driving faces in the inner nut barrel adjacent the web, which faces oppose and match the hex wrenching faces on the outer barrel and thus reduce the torsional strain on the barrel connecting web incident to ultimate tightening.

Having considered the foregoing detailed description, one who now refers back to the United-Carr Fastener (hereinafter called UCF) Patent and Heller U.S. Pat. No. 2,851,079 earlier mentioned will readily recognize the improvements in the art which are the contribution of the present disclosure and in which invention is seen to abide.

In the UCF teaching, which discloses a double barreled, sheet metal nut in the assembly, there exists an obvious lack of any upper supporting or bearing element for the portion 9 of the washer 6. Further, the connecting elements of the nut and washer intersect at substantially right angles and relatively sharp corners which provide possible impediments to independent rotation or potential increased frictional resistance to turning of the nut. Another important aspect of the present invention which is best understood by a comparison with the UCF disclosure is that a substantial narrowing of the space between the inner and outer barrel portions even to the point that they are abutting, as is frequently the case with larger size nuts requiring thicker material and an enlarged inner barrel, has no adverse affect on the nut to washer connection or the relative free spinning capabilities of the present components, whereas a similar narrowing of the spacing between the inner and outer barrels in UCF would cause a rotation inhibiting, jamming or binding of the washer portion 9. Obviously, it follows that the required spacing which must be maintained in the UCF nut gives rise to increased production costs by reason of the additional stock which must be used in fabricating larger sized nuts to be coupled to the washer in the manner disclosed therein.

The Heller U.S. Pat. No. 2,851,079 disclosure of a single walled sheet metal nut with a single helix thread form is also considered deficient in that the assembly lacks any bearing ring or other upper support for the tubular portion 32 of the washer. Further, the Heller nut to washer connection certainly does not recommend itself for use with a double barreled nut of the present type in that excessively wide spacing between the nut barrels would be required to receive the preflared end of the tubular washer portion 32, or a swaging or flaring tool which would have to pass between the nut barrels to curl the washer over the dimple 36 of the nut if the washer were first inserted in a perfectly tubular condition.

The reader, who should now have a clear understanding of the merits of the present disclosure, should proceed to refer to the claims which follow for a more precise definition of the scope of the invention protected by these Letters Patent.

We claim:

1. A sheet metal nut comprising an inner, threaded barrel portion, and an outer barrel portion joined to one end of said inner barrel portion through a connecting web, said outer barrel portion being disposed in at least partially spaced, circumscribing relationship to said inner barrel portion, said outer barrel portion having an external polygonal configuration and thus presenting a plurality of wrenching faces, the end of said inner barrel portion proximate said one end and said connecting web having a polygonal depression of limited axial extent formed therein and presenting a plurality of internal faces opposite to and matching the said wrenching faces, said polygonal section of said inner barrel portion being effective to transmit torque from said outer barrel portion to said inner barrel portion when said nut is turned onto a mating bolt with a tool engaging the said wrenching faces and thereby to reduce the torsional strain on said connecting web incident to the tightening of said nut onto a bolt.

2. A sheet metal nut according to claim 1, wherein said outer barrel portion has a peripheral bearing flange extending laterally outwardly from its end opposite said one end.

3. A sheet metal nut according to claim 1 wherein the section of said inner barrel portion having said polygonal depression formed therein carries less than a full depth thread relative to a remainder of thread on said inner barrel portion.

* * * * *

UNITED STATES PATENT OFFICE
CERTIFICATE OF CORRECTION

Patent No. 3,796,123     Dated March 12, 1974

Inventor(s) William B. Duffy et al.

It is certified that error appears in the above-identified patent and that said Letters Patent are hereby corrected as shown below:

Column 1, line 64, after "(W. Stern)" delete "and" and insert a comma. Column 4, line 7, "wit" should read -- with --; line 23, "roller" should read -- collar --; line 25, "cured" should read -- curled --.

Signed and sealed this 24th day of September 1974.

(SEAL)
Attest:

McCOY M. GIBSON JR.
Attesting Officer

C. MARSHALL DANN
Commissioner of Patents